United States Patent [19]

Reck et al.

[11] 4,435,378

[45] Mar. 6, 1984

[54] PROCESS FOR REMOVING EXTRACTABLE SUBSTANCES FROM CARBON BLACK

[75] Inventors: Reinhold Reck, Maintal; Gerhard Kühner, Hanau; Manfred Voll, Erlensee; Peter Kleinschmit, Hanau, all of Fed. Rep. of Germany

[73] Assignee: Degussa Aktiengesellschaft, Frankfurt am Main, Fed. Rep. of Germany

[21] Appl. No.: 376,051

[22] Filed: May 7, 1982

[30] Foreign Application Priority Data

May 13, 1981 [DE] Fed. Rep. of Germany ....... 3118907

[51] Int. Cl.$^3$ ...................... C01B 31/02; C01B 31/00; C09C 1/56
[52] U.S. Cl. .................................... 423/461; 423/445; 423/449; 423/460; 106/307
[58] Field of Search ............... 423/449, 460, 461, 445; 106/307

[56] References Cited

U.S. PATENT DOCUMENTS

| | | | |
|---|---|---|---|
| 2,714,055 | 7/1955 | Cines et al. | 423/460 X |
| 4,075,160 | 2/1978 | Mills et al. | 423/460 X |
| 4,138,471 | 2/1979 | Lamond et al. | 423/460 |

FOREIGN PATENT DOCUMENTS

| | | |
|---|---|---|
| 956338 | 7/1956 | Fed. Rep. of Germany. |
| 1037042 | 8/1958 | Fed. Rep. of Germany. |
| 2414215 | 9/1976 | Fed. Rep. of Germany. |
| 800975 | 9/1958 | United Kingdom ................ 423/460 |

OTHER PUBLICATIONS

Ullmanns: Encyklopadie der Technischen Chemie, pp. 634–639, vol. 14, 1977.
Locati et al., American Ind. Hyg. Ass. J., pp. 644–652, 1979.

*Primary Examiner*—Gregory A. Heller
*Attorney, Agent, or Firm*—Beveridge, DeGrandi & Kline

[57] ABSTRACT

A process for removing extractables from carbon blacks in a fluidized bed, wherein low extractable carbon blacks are treated under relatively mild temperature conditions (320° C.) with an oxygen containing gas and high extractable carbon blacks are treated first at 100°–320° C. with steam and then at 200°–500° C. with an oxygen containing gas. A definition of classification in the "low extractable" and "high extractable" categories is given.

7 Claims, No Drawings

PROCESS FOR REMOVING EXTRACTABLE SUBSTANCES FROM CARBON BLACK

The present invention relates to a process for removing extractables from carbon blacks, by treatment with a stream of gas at an elevated temperature.

Carbon blacks are produced by incomplete combustion or by thermal cracking of hydrocarbon containing materials, principally from liquid oils rich in aromatics. For their industrial manufacture, various processes are employed, amongst which the so called furnace black process has, for economic reasons, found greatest acceptance world wide. However, other processes, namely the gas black process, the flame black process and the thermal black process, are also used to produce special carbon blacks. Finally, carbon blacks are also obtained as by products from the industrial cracking of hydrocarbons. Details of the different methods of manufacture are described in Ullmann's Enzyclopaedie der technischen Chemie, Volume 14 (4th edition), 1977, page 636 et seq. which are relied on herein.

By investigating different types of carbon black, it has been possible to establish that in general the coarser qualities obtained at lower temperatures have a higher content of toluene extractables than the more finely divided qualities (Locati et al., Am. Ind. Hyg. Assoc. J. (40) page 644 et seq. (1979)). The process of manufacture also influences the toluene extractables. For example, the carbon blacks obtained by the arc process have a substantially higher content of extractables (up to 8%) than furnace, flame or gas blacks (less than 1.5%). It has therefore proved expedient to differentiate between low extractable and high extractable carbon blacks.

In contrast to the flue blacks contained in the off gases of combustion, the carbon blacks produced by the processes listed above are a category of substances which are precisely defined and specified in respect of their composition and their physico-chemical properties. These carbon blacks consist mainly of carbon and contain, dependent on the process of manufacture and the particle size, small amounts of polycyclic hydrocarbons firmly absorbed on the surface.

These hydrocarbons can be extracted by means of solvents, for example boiling toluene, and be determined quantitatively. The extract obtained can subsequently be separated by chromatographic methods; in this way, the individual hydrocarbons can be identified and determined quantitatively. The toluene extractables are determined by the method of DIN 53,553, as follows: 10 g of carbon black, in the extraction thimble of a Soxleth apparatus, are extracted with toluene for 8 hours. The extract is isolated by distilling off the solvent and is then left in a drying cabinet at 110° C. for 1 hour. The weight of the extracted constituents is determined by weighing the flask before and after the determination, and is specified as a percentage of the weight of sample.

Carbon blacks have very diverse uses. In terms of quantity, the use in the rubber sector is by far the most important. There, carbon blacks are employed mainly for reinforcing and filling. Other fields of use relate to the pigment black sector. Too high a content of extractables in the carbon blacks can, depending on the field of use, cause considerable problems. Thus, if high extractable pigment blacks are employed in plastics, undesirable migration effects may occur, especially if these systems are used in combination with systems containing colored pigments.

As regards the purity standards for carbon blacks, various countries have specified, by law, that the permissible content of toluene extractables of the carbon blacks must not exceed certain limits if the carbon black is employed in utensils which come into contact with foodstuffs. For example, in the Federal German Republic the permissible upper limit for this application is currently 0.15% by weight.

Processes for lowering the content of extractables in carbon blacks have already been disclosed, but do not differentiate between a treatment for low extractable carbon blacks and a treatment for high extractable carbon blacks.

Thus, German Auslegeschrift No. 2,414,160 proposes after treating a high extractable arc black in order to lower the acetone extractables to below 0.5% by weight. This after treatment is intended to be carried out in a stream of inert gas at 350° to 600° C.

U.S. Pat. No. 4,075,160 describes a three stage process for the after treatment of carbon black. The first stage is carried out in a furnace black reactor, the after treatment being effected either by shifting the quenching position downstream to the end of the reactor (late quench) or by introducing secondary air between the carbon black formation zone and the quenching zone, or by a combination of both measures. It is known that the temperature level before quenching is above 500°-800° C. (Ullmann's Enzyklopaedie der technischen Chemie, 4th edition, Volume 14, 1977, page 638) and accordingly the after treatment also takes place at these high temperatures. The second stage comprises treating the carbon black with strong oxidixing agents and is predominantly carried out in the aqueous phase during the pelletizing process, while the third stage merely comprises drying.

Further, U.S. Pat. No. 4,138,471 discloses a process, black by lowering the content of polycyclic aromatic hydrocarbons below a limiting value, the carbon black being pelletized with addition of a binder, then preheated and finally treated briefly in a fluidized bed at 620° C.

The first mentioned process requires expensive inert gas in order to avoid ignition of the carbon black at the temperatures used, namely above 350° C.

The process of U.S. Pat. No. 4,075,160 requires several stages, the first being carried out at relatively high temperatures in a furnace reactor and accordingly only being applicable to furnace blacks. The subsequent process step is carried out in an aqueous phase, making it unavoidable to carry out expensive drying as the final treatment.

The process of U.S. Pat. No. 4,138,471 is similarly expensive; it requires a pelletizing stage and two subsequent heating stages in air, of which the second must be carried out above 620° C. Both in this method and in the second patent quoted only pelletized carbon blacks can be produced.

It is known that under these more severe conditions the surface chemistry of the carbon blacks is greatly modified, since the oxidation results in formation of acidic surface groups. A marked drop in the pH is observed at the same time.

There is therefore a need for technological simplification of the process for lowering the content of extractables, so as to lower the investment costs and operating costs of the process and also allow it to be carried out under conditions which do not significantly modify the surface chemistry.

In our work on methods of achieving this object, we have now found that it requires differentiation of the process measures to be employed in accordance with the content of extractables of the initial carbon black. For the purposes of the present invention, low extractable carbon blacks are those in which less than 1.5% by weight of extract are obtained by the standardized toluene extraction described above. High extractable carbon blacks are those in which a toluene extract of 1.5% by weight or more is found.

The process according to the invention for removing extractables from carbon blacks starts from the conventional measure of treatment with a stream of gas at an elevated temperature and provides that low extractable carbon blacks, with up to 1.5% by weight of toluene extractables, are treated with an oxygen containing gas in a fluidized bed at temperatures below 320° C., while high extractable carbon blacks, with toluene extractables in excess of 1.5% by weight, are treated, in each case in a fluidized bed, in a first stage with steam at temperatures of 100° to 320° C. and then, in a second stage, with an oxygen containing gas at temperatures of 200° to 500° C.

It is essential that in both embodiments of the process a carbon black in powder form is treated, in a fluidized bed, with the stated streams of gas; the process may be carried out continuously or batchwise.

We have found that in each case fluidized bed constructions may be used in which the carbon black and a heated gas stream travel in co-current or counter current direction.

The steam is preferably employed as saturated steam; the preferred oxygen containing gas is air.

The low extractable carbon blacks, especially the coarse pigment blacks from the furnace black process and the gas black process are preferably treated at temperatures of 200° to 320° C. The treatment times at these low temperatures are surprisingly brief and are 1–3 hours depending on the amount of extractables in the initial carbon black, and on the temperature used.

The high extractable carbon blacks, especially those which are obtained from the manufacture of acetylene by the arc process, are preferably treated at temperatures of 100° to 250° C. in the first stage, namely the steam treatment, and at temperatures of 250° to 450° C. in the second stage, namely the treatment with an oxygen containing gas.

The treatment times in the first stage are only 0.5–1.5 hours; in the second stage they may be 1–4 hours.

Compared to the conventional processes, discussed at the outset, for lowering the content of extractables, the process according to the invention gives the following advantages: the use of an inert gas is dispensed with. In the case of high extractable carbon blacks, the danger of ignition is eliminated. The properties of the carbon blacks are substantially preserved, due to the low temperature level. In particular, a high temperature treatment of the initial carbon black in the presence of oxygen is avoided. The process is simple to carry out and reduces investment costs and operating costs, since there is no need to use high temperature resistant materials of construction in the apparatus. Moreover, the surface chemistry of the carbon blacks is virtually unaffected.

It is true that in addition to the prior art processes discussed at the outset, further processes for obtaining low extractable carbon blacks are disclosed in German Pat. No. 956,338 and German Auslegeschrift No. 1,037,042, which provide air, a mixture of air and steam or a nonoxidizing atmosphere for the after treatment of carbon blacks. However, these processes, in contrast to the present process, are aimed at modifying the surface chemistry of the carbon blacks (lowering the pH, increasing the content of volatiles, increasing the depth of color etc.).

Accordingly, these processes also propose treatment temperatures which, comparatively speaking, are substantially higher.

The effect, on the surface chemistry, of the formation of acidic surface oxides can be monitored by pH measurement. This determination is carried out by the method of DIN 53,200: to determine the pH, 1 g of carbon black is suspended in 20 ml of freshly distilled $CO_2$ free water and the mixture is stirred for 1 minute with a magnetic stirrer. The glass electrode of a pH meter is then dipped into the suspension and after 1 minute the pH is read off. Pelletized carbon blacks must be pulverized before being weighed out.

The determination of the volatile constituents by the method of DIN 53,552 can also provide indications of the "degree of oxidation." This method is however relatively imprecise and does not always permit unambiguous conclusions. It provides meaningful values only if carbon blacks which have been after treated under comparable conditions are being investigated. The volatiles are determined as follows: the carbon black is introduced into a crucible having a well-fitting lid possessing a 2 mm hole, and is heated for 7 minutes in a muffle furnace at 950° C. The weight loss on heating is stated in percent of the weight of sample and represents the volatiles.

The invention is explained in more details below with the aid of examples of both embodiments of the process, in conjunction with prior art comparative examples. Since the process according to the invention can be used for the after treatment, to lower the extractables content, of carbon blacks which have been produced by a variety of methods of manufacture, such carbon blacks were prepared with different contents of extractables and after treated as described in the examples below.

EXAMPLE 1

100 g of carbon black having the characteristic data shown below were treated with a heated gas stream in a heated fluidized bed at 80 mm diameter and 2,000 mm length, the carbon black and gas stream travelling in co-current direction.

|  | Carbon black 1 |
| --- | --- |
| Nigrometer index | 83 |
| Volatiles | 6.6% by weight |
| Toluene extractables | 0.15% by weight |
| pH | 3.6 |

On after treatment for 3 hours at 220° C. with nitrogen as a fluidizing gas, the following carbon black was obtained:

|  | Carbon black 1a |
| --- | --- |
| Nigrometer index | 83 |
| Volatiles | 5.7% by weight |

|  | Carbon black 1a |
|---|---|
| Toluene extractables | 0.14% by weight |
| pH | 3.7 |

As may be seen from the characteristic data of the after treated carbon black, the initial carbon black has undergone virtually no change under the experimental conditions chosen. In particular, the toluene extractables have remained at the same level.

EXAMPLE 2

Using the same experimental conditions as in Example 1, and the same initial carbon black, but with air as the fluidizing gas, the following carbon black was obtained:

|  | Carbon black 1b |
|---|---|
| Nigrometer index | 83 |
| Volatiles | 7.3% by weight |
| Toluene extractables | 0.08% by weight |
| pH | 3.8 |

Thus, in comparison with Example 1, the use of the process according to the invention resulted in a carbon black which has a markedly lower content of extractables than has the initial carbon black. The other characteristic data change only little. In particular, the pH of 3.8 shows that the gentle after treatment leaves the content of acidic surface groups virtually unaltered.

EXAMPLE 3

The initial carbon black 1 was subjected to the after treatment at a higher temperature, namely 300° C., but under otherwise the same experimental conditions as in Example 1:

|  | Carbon black 1c |
|---|---|
| Nigrometer index | 83 |
| Volatiles | 7.4% by weight |
| Toluene extractables | 0.10% by weight |
| pH | 3.9 |

The temperature of the after treatment, which is higher than that used in Example 1, leads to partial but very incomplete removal of the toluene extractables. This example shows that for greater reduction of the toluene extractables, using an inert gas a fluidizing gas, it would be necessary to use either very much higher temperatures or markedly longer residence times. It is for this reason that on using inert conditions in accordance with German Auslegeschrift No. 2,414,215 substantially higher temperatures (350°–600° C.) are required.

EXAMPLE 4

If, on the other hand, the process according to the invention is employed with air as the fluidizing gas, under otherwise the same conditions as in Example 3, the following carbon black is obtained:

|  | Carbon black 1d |
|---|---|
| Nigrometer index | 83 |
| Volatiles | 9.5% by weight |
| Toluene | 0.003% by weight |
| pH | 3.4 |

The extremely low toluene extractables show the effectiveness of this procedure. The slight change in pH shows that under the chosen conditions there is as yet no significant modification of the surface chemistry.

EXAMPLE 5

The initial carbon black and reaction conditions correspond to Example 2. As a deviation therefrom, a mixture of air and steam (36% by volume) was used as the fluidizing gas.

|  | Carbon black 1e |
|---|---|
| Nigrometer index | 83 |
| Volatiles | 7.2% by weight |
| Toluene extractables | 0.07% by weight |
| pH | 3.8 |

If these characteristic data are compared with those of Example 2, virtually no differences are discernible. Accordingly, the addition of steam produces no advantages.

EXAMPLE 6

An initial carbon black having the following characteristic data was used:

|  | Carbon black 2 |
|---|---|
| Nigrometer index | 83 |
| Volatiles | 6.8% by weight |
| Toluene extractables | 0.53% by weight |
| pH | 3.7 |

The after treatment was carried out in accordance with Example 4, using air at 300° C. for 3 hours.

|  | Carbon black 2a |
|---|---|
| Nigrometer index | 83 |
| Volatiles | 9.4% by weight |
| Toluene extractables | 0.02% by weight |
| pH | 3.4 |

These values show clearly that even an initial carbon black with the higher extractables content of 0.53% can be brought to very low extractables values by the process employed here.

EXAMPLE 7

The same initial carbon black as in Example 1 is treated for 1.5 hours with a stream of air in a fluidized bed of 200 mm diameter and 2,000 mm length at 300° C. for 1.5 hours, the carbon black and air travelling in counter current. The treated product has the following properties:

|  | Carbon black 1f |
|---|---|
| Nigrometer index | 83 |
| Volatiles | 9.5% by weight |
| Toluene extractables | 0.05% by weight |
| pH | 3.8 |

Thus a reduction of the extractables content to very low values can be achieved also by the counter current method, the reaction time being halved compared to Example 4.

EXAMPLE 8

The initial carbon black has the following properties:

|  | Carbon black 3 |
| --- | --- |
| Nigrometer index | 90 |
| Volatiles | 1.0% by weight |
| Toluene extractables | 0.10% by weight |
| pH | 8.1 |

The after treatment was carried out analogously to Example 2. This gave, as the end product:

|  | Carbon black 3a |
| --- | --- |
| Nigrometer index | 90 |
| Volatiles | 1.3% by weight |
| Toluene extractables | 0.03% by weight |
| pH | 7.8 |

While with the carbon blacks in Examples 1–7 the initial carbon black had a pH of 3.6, a carbon black with less surface oxides, corresponding to a pH of 8.1, was employed in the present example.

Here again, the toluene extractables are greatly reduced, with very little effect on the surface chemistry.

Example 8, like the preceding examples, shows that for a marked reduction in toluene extractables of low extractable carbon blacks, relatively mild conditions, i.e. temperatures below 320° C., suffice. The use of steam in these cases offers no advantages whatsoever.

This is surprising inasmuch as in the prior art literature quoted at the outset substantially more severe conditions, i.e. temperatures higher than 340° C., several process steps, substantially stronger oxidizing agents, such as nitric acid, etc. are employed. The very different process steps and conditions, compared to the process according to the invention, also result in a marked modification of the surface chemistry. For example, in German Patent No. 956,338 the pH is depressed by 6.1 units. This is attributable to severe oxidation of the carbon black.

If it is desired to lower the extractables content of high extractable (greater than 1.5%) carbon blacks substantially, an after treatment with air, even under gentle conditions, presents the hazard that the carbon black/air mixture may ignite. This is also the reason why inert gas is used in German Auslegeschrift No. 2,414,215. The danger of ignition also exists if the after treatment is carried out with a mixture of air and steam in substantially equal proportions and the after treatment temperature markedly exceeds the 300° C. limit. A variety of after treatment conditions with various steam/air mixtures at 400° C. in every case led to ignition.

Accordingly there is a need to provide, also for the high extractable carbon blacks, a method or reducing the extractables which is safe to operate.

It was therefore very surprising that for this group of carbon blacks rapid and safe reduction of the extractables is possible even at temperatures of about 400° C. up to 500° C., if the actual after treatment with air is preceded by a brief gentle treatment with steam.

The examples which follow explain in more detail the process according to the invention for high extractable carbon blacks.

EXAMPLE 9

The initial carbon black used had the following characteristic data:

|  | Carbon black 4 |
| --- | --- |
| Nigrometer index | 81 |
| Volatiles | 7.6% by weight |
| Toluene extractables | 5.5% by weight |
| pH | 6.2 |

For each treatment stage, a fluidized bed corresponding in its dimensions to that of Example 1 was used.
1st treatment stage:
 fluidizing gas: steam at 250° C.
 reaction time: 1.5 h
2nd treatment stage:
 fluidizing gas: air at 250° C.
 reaction time: 2.5 h The after treated carbon black had the following characteristic data:

|  | Carbon black 4a |
| --- | --- |
| Nigrometer index | 81 |
| Volatiles | 10.2% by weight |
| Toluene extractables | 0.59% by weight |
| pH | 5.5 |

Even under these conditions, the toluene extractables can be substantially reduced, but do not reach the level achieved in the preceding examples.

EXAMPLE 10

Here the reaction time in the second stage was increased, compared to Example 9, from 2.5 to 4 hours, under otherwise identical conditions. After this treatment, the carbon black had the following data:

|  | Carbon black 3a |
| --- | --- |
| Nigrometer index | 81 |
| Volatiles | 9.7% by weight |
| Toluene extractables | 0.55% by weight |
| pH | 5.4 |

Increasing the reaction time in stage 2 does not produce a further reduction in toluene extractables.

EXAMPLE 11

The initial carbon black, and the reaction conditions in the first stage, were as in Examples 9 and 10.

In the 2nd treatment stage, the reaction temperature was raised to 400° C. The reaction time was 1 hour.

The carbon black after treated in this way had substantially lower toluene extractables than in the two preceding examples.

|  | Carbon black 3c |
| --- | --- |
| Nigrometer index | 81 |
| Volatiles | 10.7% by weight |
| Toluene extractables | 0.06% by weight |

-continued

| | Carbon black 3c |
|---|---|
| pH | 5.2 |

As this example shows, raising the temperature in the 2nd treatment step presents no hazard.

EXAMPLE 12

The initial carbon black and reaction conditions in the second treatment stage are the same as in Example 11. In the 1st treatment stage the temperature was lowered to 130° C. and the treatment time to 1 hour.

| | Carbon black 3d |
|---|---|
| Nigrometer index | 81 |
| Volatiles | 10.7% by weight |
| Toluene extractables | 0.05% by weight |
| pH | 5.0 |

The result in Example 12 is similar to that in Example 11. This means that in the first stage very low temperatures and short reaction times are needed to allow the subsequent treatment with air to give the desired result, without danger of ignition.

EXAMPLE 13

Carbon black 1 d from Example 4 and, for comparison, the initial carbon black 1, were worked into a nitrocellulose gravure ink.
Printing ink recipe:
9.8% by weight of carbon black 1 or carbon black 1 d
21.6% by weight of alcohol soluble nitrocellulose (standard viscosity grade 30 A according to DIN 53,179)
3.6% by weight of dibutyl phthalate
3.6% by weight of ethylglycol
47.0% by weight of ethyl alcohol
14.4% by weight of ethyl acetate The inks were dispersed for 24 hours in a ball mill, proof prints were produced and the following data were determined:

| | Carbon black 1 | Carbon black 1d |
|---|---|---|
| Flow time (4 mm DIN cup) (sec) | 27.2 | 27.0 |
| Gravure print on aluminum foil | | |
| Density (optical density) at 40 cell depth | 1.96 | 1.98 |
| Gloss (%) 60° Byk-Mallinckrodt pocket gloss | 63 | 64 |

Comparison of the data measured on the two printing inks shows that the treatment of the carbon black by the process according to the invention produces only slight changes.

EXAMPLE 14

Carbon black 3 a from Example 8 and, in comparison, initial carbon black 3, were incorporated into a relief printing ink for newspapers. The following recipe was used:
11% by weight of carbon black 3 of carbon black 3 a
89% by weight of varnish A 280
varnish A 280:
  1.0% by weight of Gilsonite EWC 7214 (hard asphalt)
  26.6% by weight of Nigrex Oil 979, a high aromatics naphthenic oil (SHELL), kinematic viscosity according to DIN 51,562 about 10, 375 mm$^2$/s at 20° C.
  72.4% by weight of Nigrex Oil 934, a high aromatics naphthenic oil (SHELL), kinematic viscosity according to DIN 51,562 about 500 mm$^2$/s at 200° C.

The inks were dispersed in a stirred ball mill. The following data were measured on the two printing inks:

| | Carbon black 3 | Carbon black 3a |
|---|---|---|
| Viscosity $\eta$ (Pa.s) | 1.3 | 1.4 |
| Liquid limit $\tau$ (Pa) | 5 | 4 |
| Density (at 3 g/m$^2$) | 1.00 | 1.02 |

The viscosity and liquid limit were determined by measurements in a rotary viscometer at 23° C. and were evaluated by the Casson method. The density was measured by means of a Pruefbau multidens (incident light densitometer) on proof prints produced on a Pruefbau proof printer (for letterpress and offset printing inks).

The measured values for both printing inks were virtually identical.

Treating carbon black 3 by the process according to the invention has only an insignificant effect on its properties in respect of use in this printing ink.

We claim:

1. A process for removing toluene extractable substances from powdery carbon blacks by treatment with a stream of gas at an elevated temperature comprising treating powdery carbon black containing 0.15 to 1.5% by weight of toluene extractable substances with an oxygen containing gas in a fluidized bed at a temperature from 200° to 320° C.

2. The process according to claim 1, wherein carbon black and the gas stream travel cocurrent or countercurrent.

3. The process according to claim 1, wherein the oxygen containing gas is air.

4. A process for removing toluene extractable substances from powdery carbon blacks by treatment with a stream of gas at an elevated temperature, comprising treating powdery carbon black containing toluene extractable substances in excess of 1.5% by weight or more in a fluidized bed in a first stage with steam at temperatures of 100° to 320° C. and then, in a second stage, with an oxygen containing gas at temperatures of 200° to 500° C.

5. The process according to claim 4, wherein carbon black and gas stream travel cocurrent or countercurrent.

6. The process according to claim 4, wherein the oxygen containing gas is air.

7. The process according to claim 4, wherein the carbon black is treated in the first stage at 100° to 250° C. and in the second stage, at 250° to 450° C.

* * * * *